(12) United States Patent
Veregin et al.

(10) Patent No.: US 6,309,042 B1
(45) Date of Patent: Oct. 30, 2001

(54) MARKING MATERIALS AND MARKING PROCESSES THEREWITH

(75) Inventors: Richard P. N. Veregin, Mississauga (CA); Carl P. Tripp, Orono, ME (US); Maria N. V. McDougall; T. Brian McAneney, both of Burlington (CA)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/408,606

(22) Filed: Sep. 30, 1999

(51) Int. Cl.[7] .................................................. B41J 2/015
(52) U.S. Cl. .............................................................. 347/21
(58) Field of Search .................................. 347/20, 21, 46, 347/54, 83; 395/104; 210/516; 346/140.1; 430/106, 137; 106/490

(56) References Cited

U.S. PATENT DOCUMENTS

| | | | |
|---|---|---|---|
| 4,257,886 | * 3/1981 | Kessler | 210/516 |
| 4,960,677 | 10/1990 | Seibles et al. | 430/331 |
| 4,973,540 | 11/1990 | Machida et al. | 430/110 |
| 5,165,013 | * 11/1992 | Faris | 395/104 |
| 5,281,478 | 1/1994 | Höhner et al. | 428/404 |
| 5,306,588 | 4/1994 | Tanaka et al. | 430/110 |
| 5,376,172 | 12/1994 | Tripp et al. | 106/490 |
| 5,484,675 | 1/1996 | Tripp et al. | 430/106 |
| 6,116,718 | * 9/2000 | Peeters et al. | 347/21 |
| 6,154,226 | * 11/2000 | York et al. | 346/140.1 |

FOREIGN PATENT DOCUMENTS 2224648  9/1990  (JP) .

* cited by examiner

*Primary Examiner*—Anh T. N. Vo
(74) *Attorney, Agent, or Firm*—Judith L. Byorick

(57) ABSTRACT

Disclosed is an apparatus for depositing a particulate marking material onto a substrate, comprising (a) a printhead having defined therein at least one channel, each channel having an inner surface and an exit orifice with a width no larger than about 250 microns, the inner surface of each channel having thereon a hydrophobic coating material; (b) a propellant source connected to each channel such that propellant provided by the propellant source can flow through each channel to form propellant streams therein, said propellant streams having kinetic energy, each channel directing the propellant stream through the exit orifice toward the substrate; and (c) a marking material reservoir having an inner surface, said inner surface having thereon the hydrophobic coating material, said reservoir containing particles of a particulate marking material, said reservoir being communicatively connected to each channel such that the particulate marking material from the reservoir can be controllably introduced into the propellant stream in each channel so that the kinetic energy of the propellant stream can cause the particulate marking material to impact the substrate, wherein either (i) the marking material particles of particulate marking material have an outer coating of the hydrophobic coating material; or (ii) the marking material particles have additive particles on the surface thereof, said additive particles having an outer coating of the hydrophobic coating material; or (iii) both the marking material particles and the additive particles have an outer coating of the hydrophobic coating material.

20 Claims, 10 Drawing Sheets

MARKING MATERIALS AND MARKING PROCESSES THEREWITH

BACKGROUND OF THE INVENTION

The present invention is directed to marking materials. More specifically, the present invention is directed to marking materials particularly suitable for use in ballistic aerosol marking apparatus and processes. One embodiment of the present invention is directed to an apparatus for depositing a particulate marking material onto a substrate, comprising (a) a printhead having defined therein at least one channel, each channel having an inner surface and an exit orifice with a width no larger than about 250 microns, the inner surface of each channel having thereon a hydrophobic coating material; (b) a propellant source connected to each channel such that propellant provided by the propellant source can flow through each channel to form propellant streams therein, said propellant streams having kinetic energy, each channel directing the propellant stream through the exit orifice toward the substrate; and (c) a marking material reservoir having an inner surface, said inner surface having thereon the hydrophobic coating material, said reservoir containing particles of a particulate marking material, said reservoir being communicatively connected to each channel such that the particulate marking material from the reservoir can be controllably introduced into the propellant stream in each channel so that the kinetic energy of the propellant stream can cause the particulate marking material to impact the substrate, wherein either (i) the marking material particles of particulate marking material have an outer coating of the hydrophobic coating material; or (ii) the marking material particles have additive particles on the surface thereof, said additive particles having an outer coating of the hydrophobic coating material; or (iii) both the marking material particles and the additive particles have an outer coating of the hydrophobic coating material.

Ink jet is currently a common printing technology. There are a variety of types of ink jet printing, including thermal ink jet printing, piezoelectric ink jet printing, and the like. In ink jet printing processes, liquid ink droplets are ejected from an orifice located at one terminus of a channel. In a thermal ink jet printer, for example, a droplet is ejected by the explosive formation of a vapor bubble within an ink bearing channel. The vapor bubble is formed by means of a heater, in the form of a resistor, located on one surface of the channel.

Several disadvantages can be associated with known ink jet systems. For a 300 spot-per-inch (spi) thermal ink jet system, the exit orifice from which an ink droplet is ejected is typically on the order of about 64 microns in width, with a channel-to-channel spacing (pitch) of typically about 84 microns; for a 600 dpi system, width is typically about 35 microns and pitch is typically about 42 microns. A limit on the size of the exit orifice is imposed by the viscosity of the fluid ink used by these systems. It is possible to lower the viscosity of the ink by diluting it with increasing amounts of liquid (such as water) with an aim to reducing the exit orifice width. The increased liquid content of the ink, however, results in increased wicking, paper wrinkle, and slower drying time of the ejected ink droplet, which negatively affects resolution, image quality (such as minimum spot size, intercolor mixing, spot shape), and the like. The effect of this orifice width limitation is to limit resolution of thermal ink jet printing, for example to well below 900 spi, because spot size is a function of the width of the exit orifice, and resolution is a function of spot size.

Another disadvantage of known ink jet technologies is the difficulty of producing greyscale printing. It is very difficult for an ink jet system to produce varying size spots on a printed substrate. If one lowers the propulsive force (heat in a thermal ink jet system) so as to eject less ink in an attempt to produce a smaller dot, or likewise increases the propulsive force to eject more ink and thereby to produce a larger dot, the trajectory of the ejected droplet is affected. The altered trajectory in turn renders precise dot placement difficult or impossible, and not only makes monochrome greyscale printing problematic, it makes multiple color greyscale ink jet printing impracticable. In addition, preferred greyscale printing is obtained not by varying the dot size, as is the case for thermal ink jet, but by varying the dot density while keeping a constant dot size.

Still another disadvantage of common ink jet systems is rate of marking obtained. Approximately 80 percent of the time required to print a spot is taken by waiting for the ink jet channel to refill with ink by capillary action. To a certain degree, a more dilute ink flows faster, but raises the problem of wicking, substrate wrinkle, drying time, and the like, discussed above.

One problem common to ejection printing systems is that the channels may become clogged. Systems such as thermal ink jet which employ aqueous ink colorants are often sensitive to this problem, and routinely employ non-printing cycles for channel cleaning during operation. This clearing is required, since ink typically sits in an ejector waiting to be ejected during operation, and while sitting may begin to dry and lead to clogging.

Ballistic aerosol marking processes overcome many of these disadvantages. Ballistic aerosol marking is a process for applying a marking material to a substrate, directly or indirectly. In particular, the ballistic aerosol marking system includes a propellant which travels through a channel, and a marking material that is controllably (i.e., modifiable in use) introduced, or metered, into the channel such that energy from the propellant propels the marking material to the substrate. The propellant is usually a dry gas that can continuously flow through the channel while the marking apparatus is in an operative configuration (i.e., in a power-on or similar state ready to mark). Examples of suitable propellants include carbon dioxide gas, nitrogen gas, clean dry ambient air, gaseous products of a chemical reaction, or the like; preferably, non-toxic propellants are employed, although in certain embodiments, such as devices enclosed in a special chamber or the like, a broader range of propellants can be tolerated. The system is referred to as "ballistic aerosol marking" in the sense that marking is achieved by in essence launching a non-colloidal, solid or semi-solid particulate, or alternatively a liquid, marking material at a substrate. The shape of the channel can result in a collimated (or focused) flight of the propellant and marking material onto the substrate.

The propellant can be introduced at a propellant port into the channel to form a propellant stream. A marking material can then be introduced into the propellant stream from one or more marking material inlet ports. The propellant can enter the channel at a high velocity. Alternatively, the propellant can be introduced into the channel at a high pressure, and the channel can include a constriction (for example, de Laval or similar converging/diverging type nozzle) for converting the high pressure of the propellant to high velocity. In such a situation, the propellant is introduced at a port located at a proximal end of the channel (the converging region), and the marking material ports are provided near the distal end of the channel (at or further down-stream of the diverging region), allowing for introduction of marking material into the propellant stream.

In the situation where multiple ports are provided, each port can provide for a different color (for example, cyan, magenta, yellow, and black), pre-marking treatment material (such as a marking material adherent), post-marking treatment material (such as a substrate surface finish material, for example, matte or gloss coating, or the like), marking material not otherwise visible to the unaided eye (for example, magnetic particle-bearing material, ultraviolet-fluorescent material, or the like) or other marking material to be applied to the substrate. Examples of materials suitable for pre-marking treatment and post-marking treatment include polyester resins (either linear or branched); poly (styrenic) homopolymers; poly(acrylate) and poly (methacrylate) homopolymers and mixtures thereof; random copolymers of styrenic monomers with acrylate, methacrylate, or butadiene monomers and mixtures thereof; polyvinyl acetals; poly(vinyl alcohol)s; vinyl alcohol-vinyl acetal copolymers; polycarbonates; mixtures thereof; and the like. The marking material is imparted with kinetic energy from the propellant stream, and ejected from the channel at an exit orifice located at the distal end of the channel in a direction toward a substrate.

One or more such channels can be provided in a structure which, in one embodiment, is referred to herein as a printhead. The width of the exit (or ejection) orifice of a channel is typically on the order of about 250 microns or smaller, and preferably in the range of about 100 microns or smaller. When more than one channel is provided, the pitch, or spacing from edge to edge (or center to center) between adjacent channels can also be on the order of about 250 microns or smaller, and preferably in the range of about 100 microns or smaller. Alternatively, the channels can be staggered, allowing reduced edge-to-edge spacing. The exit orifice and/or some or all of each channel can have a circular, semicircular, oval, square, rectangular, triangular or other cross-sectional shape when viewed along the direction of flow of the propellant stream (the channel's longitudinal axis).

The marking material to be applied to the substrate can be transported to a port by one or more of a wide variety of ways, including simple gravity feed, hydrodynamic, electrostatic, or ultrasonic transport, or the like. The material can be metered out of the port into the propellant stream also by one of a wide variety of ways, including control of the transport mechanism, or a separate system such as pressure balancing, electrostatics, acoustic energy, ink jet, or the like.

The marking material to be applied to the substrate can be a solid or semi-solid particulate material, such as a toner or variety of toners in different colors, a suspension of such a marking material in a carrier, a suspension of such a marking material in a carrier with a charge director, a phase change material, or the like. Preferably the marking material is particulate, solid or semi-solid, and dry or suspended in a liquid carrier. Such a marking material is referred to herein as a particulate marking material. A particulate marking material is to be distinguished from a liquid marking material, dissolved marking material, atomized marking material, or similar non-particulate material, which is generally referred to herein as a liquid marking material. However, ballistic aerosol marking processes are also able to utilize such a liquid marking material in certain applications.

Ballistic aerosol marking processes also enable marking on a wide variety of substrates, including direct marking on non-porous substrates such as polymers, plastics, metals, glass, treated and finished surfaces, and the like. The reduction in wicking and elimination of drying time also provides improved printing to porous substrates such as paper, textiles, ceramics, and the like. In addition, ballistic aerosol marking processes can be configured for indirect marking, such as marking to an intermediate transfer roller or belt, marking to a viscous binder film and nip transfer system, or the like.

The marking material to be deposited on a substrate can be subjected to post ejection modification, such as fusing or drying, overcoating, curing, or the like. In the case of fusing, the kinetic energy of the material to be deposited can itself be sufficient effectively to melt the marking material upon impact with the substrate and fuse it to the substrate. The substrate can be heated to enhance this process. Pressure rollers can be used to cold-fuse the marking material to the substrate. In-flight phase change (solid-liquid-solid) can alternatively be employed. A heated wire in the particle path is one way to accomplish the initial phase change. Alternatively, propellant temperature can accomplish this result. In one embodiment, a laser can be employed to heat and melt the particulate material in-flight to accomplish the initial phase change. The melting and fusing can also be electrostatically assisted (i.e., retaining the particulate material in a desired position to allow ample time for melting and fusing into a final desired position). The type of particulate can also dictate the post-ejection modification. For example, ultraviolet curable materials can be cured by application of ultraviolet radiation, either in flight or when located on the material-bearing substrate.

Since propellant can continuously flow through a channel, channel clogging from the build-up of material is reduced (the propellant effectively continuously cleans the channel). In addition, a closure can be provided that isolates the channels from the environment when the system is not in use. Alternatively, the printhead and substrate support (for example, a platen) can be brought into physical contact to effect a closure of the channel. Initial and terminal cleaning cycles can be designed into operation of the printing system to optimize the cleaning of the channel(s). Waste material cleaned from the system can be deposited in a cleaning station. It is also possible, however, to engage the closure against an orifice to redirect the propellant stream through the port and into the reservoir thereby to flush out the port.

Further details on the ballistic aerosol marking process are disclosed in, for example, Copending Application U.S. Ser. No. 09/163,893, filed Sep. 30, 1998, with the named inventors Gregory B. Anderson, Steven B. Bolte, Dan A. Hays, Warren B. Jackson, Gregory J. Kovacs, Meng H. Lean, Jaan Noolandi, Joel A. Kubby, Eric Peeters, Raj B. Apte, Philip D. Floyd, An-Chang Shi, Frederick J. Endicott, Armin R. Volkel, and Jonathan A. Small, entitled "Ballistic Aerosol Marking Apparatus for Marking a Substrate," Copending Application U.S. Ser. No. 09/164,124, filed Sep. 30, 1998, with the named inventors Gregory B. Anderson, Steven B. Bolte, Dan A. Hays, Warren B. Jackson, Gregory J. Kovacs, Meng H. Lean, Jaan Noolandi, Joel A. Kubby, Eric Peeters, Raj B. Apte, Philip D. Floyd, An-Chang Shi, Frederick J. Endicott, Armin R. Volkel, and Jonathan A. Small, entitled "Method of Marking a Substrate Employing a Ballistic Aerosol Marking Apparatus," Copending Application U.S. Ser. No. 09/164,250 filed Sep. 30, 1998, with the named inventors Gregory B. Anderson, Danielle C. Boils, Steven B. Bolte, Dan A. Hays, Warren B. Jackson, Gregory J. Kovacs, Meng H. Lean, T. Brian McAneney, Maria N. V. McDougall, Karen A. Moffat, Jaan Noolandi, Richard P. N. Veregin, Paul D. Szabo, Joel A. Kubby, Eric Peeters, Raj B. Apte, Philip D. Floyd, An-Chang Shi, Frederick J. Endicott, Armin R. Volkel, and Jonathan A. Small, entitled "Ballistic Aerosol Marking Apparatus for Treating a Substrate," Copending Application U.S. Ser. No. 09/163,808, filed Sep. 30, 1998, with the named inventors Gregory B. Anderson, Danielle C. Boils, Steven B. Bolte, Dan A. Hays, Warren B. Jackson, Gregory J. Kovacs, Meng H. Lean, T. Brian McAneney, Maria N. V. McDougall, Karen A. Moffat, Jaan Noolandi, Richard P. N. Veregin, Paul D. Szabo, Joel A. Kubby, Eric Peeters, Raj B. Apte, Philip D. Floyd, An-Chang Shi, Frederick J. Endicott, Armin R. Volkel, and Jonathan A. Small, entitled "Method of Treating a Substrate Employing a Ballistic Aerosol Marking Apparatus," Copending Application U.S. Ser. No. 09/163,765, filed Sep. 30, 1998, with the named inventors Gregory B. Anderson, Steven B. Bolte, Dan A. Hays, Warren B. Jackson, Gregory J. Kovacs, Meng H. Lean, Joan Noolandi, Joel A. Kubby, Eric Peeters, Raj B. Apte, Philip D. Floyd, An-Chang Shi, Frederick J. Endicott, Armin R. Volkel, and Jonathan A. Small, entitled "Cartridge for Use in a Ballistic Aerosol Marking Apparatus," Copending Application U.S. Ser. No. 09/163,839, filed Sept. 30, 1998, with the named inventors Abdul M. Elhatem, Dan A. Hays, Joan Noolandi, Kaiser H. Wong, Joel A. Kubby, Tuan Anh Vo, and Eric Peeters, entitled "Marking Material Transport," Copending application U.S. Ser. No. 09/163,954, filed Sep. 30, 1998, with the named inventors Gregory B. Anderson, Andrew A. Berlin, Steven B. Bolte, Ga Neville Connell, Dan A. Hays, Warren B. Jackson, Gregory J. Kovacs, Meng H. Lean, Joan Noolandi, Joel A. Kubby, Eric Peeters, Raj B. Apte, Philip D. Floyd, An-Chang Shi, Frederick J. Endicott, Armin R. Volkel, and Jonathan A. Small, entitled "Ballistic Aerosol Marking Apparatus for Marking with a Liquid Material," Copending Application U.S. Ser. No. 09/163,924, filed Sep. 30, 1998, with the named inventors Gregory B. Anderson, Andrew A. Berlin, Steven B. Bolte, Ga Neville Connell, Dan A. Hays, Warren B. Jackson, Gregory J. Kovacs, Meng H. Lean, Joan Noolandi, Joel A. Kubby, Eric Peeters, Raj B. Apte, Philip D. Floyd, An-Chang Shi, Frederick J. Endicott, Armin R. Volkel, and Jonathan A. Small, entitled "Method for Marking with a Liquid Material Using a Ballistic Aerosol Marking Apparatus," Copending Application U.S. Ser. No. 09/163,825, filed Sep. 30, 1998, with the named inventor Kaiser H. Wong, entitled "Multi-Layer Organic Overcoat for Electrode Grid," Copending Application U.S. Ser. No. 09/164,104, filed Sep. 30, 1998, with the named inventors T. Brian McAneney, Jaan Noolandi, and An-Chang Shi, entitled "Kinetic Fusing of a Marking Material," Copending Application U.S. Ser. No. 09/163,904, filed Sep. 30, 1998, with the named inventors Meng H. Lean, Jaan Noolandi, Eric Peeters, Raj B. Apte, Philip D. Floyd, and Armin R. Volkel, entitled "Print Head for Use in a Ballistic Aerosol Marking Apparatus," Copending Application U.S. Ser. No. 09/163,799, filed Sep. 30, 1998, with the named inventors Meng H. Lean, Jaan Noolandi, Eric Peeters, Raj B. Apte, Philip D. Floyd, and Armin R. Volkel, entitled "Method of Making a Print Head for Use in a Ballistic Aerosol Marking Apparatus," Copending Application U.S. Ser. No. 09/163,664, filed Sep. 30, 1998, with the named inventors Bing R. Hsieh, Kaiser H. Wong, and Tuan Anh Vo, entitled "Organic Overcoat for Electrode Grid," and Copending Application U.S. Ser. No. 09/163,518, filed Sep. 30, 1998, with the named inventors Kaiser H. Wong and Tuan Anh Vo, entitled ",Inorganic Overcoat for Particulate Transport Electrode Grid", the disclosures of each of which are totally incorporated herein by reference.

U.S. Pat. No. 5,484,675 (Tripp et al.), the disclosure of which is totally incorporated herein by reference, discloses a toner composition comprising resin and pigment particles, where the pigment particles are treated with a fluorosilane polymer.

U.S. Pat. No. 5,376,172 (Tripp et al.), the disclosure of which is totally incorporated herein by reference, discloses a process for preparing silane treated metal oxides comprising reacting a metal oxide with an amine compound to form an amine metal oxide intermediate, and subsequently reacting said intermediate with a halosilane.

U.S. Pat. No. 5,306,588 (Tanaka et al.), the disclosure of which is totally incorporated herein by reference, discloses a treated silica fine powder and a toner having this powder for use as a toner for developing an electrostatic image. The treated silica fine powder is formed of treated fine silica particles obtained by treating fine silica particles with (a) a first silane coupling agent in which at least one of a substituted secondary alkyl group, an unsubstituted secondary alkyl group, a substituted tertiary alkyl group, an unsubstituted tertiary alkyl group, a substituted cyclic hydrocarbon group, and an unsubstituted cyclic hydrocarbon group is bonded to a silicon atom of the silane coupling agent, and by thereafter treating the resultant fine particles of silica with a second silane coupling agent having the formula

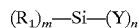

$$(R_1)_m\text{—Si—}(Y)_n$$

wherein $R_1$ represents a methyl group, a halomethyl group, a saturated straight chain hydrocarbon group, or an unsaturated straight chain hydrocarbon group, Y represents an alkoxy group or a halogen group, m represents an integer of 1 to 3, n represents an integer of 1 to 3, and the sum of m plus n is 4.

U.S. Pat. No. 5,281,478 (Höhner et al.), the disclosure of which is totally incorporated herein by reference, discloses a method for modifying the surface of finely divided particles, such as pigments and fillers, or of glass fibers. The method utilizes organopolysiloxane with epoxy and long-chain alkyl groups linked over carbon atoms to silicon atoms.

Japanese Patent 2224648, the disclosure of which is totally incorporated herein by reference, discloses a process for preparing metal oxide particles treated with a silicon compound that contains perfluoroalkyl groups.

U.S. Pat. No. 4,960,677 (Seibles et al.), the disclosure of which is totally incorporated herein by reference, discloses a dry nonelectroscopic toner surface coated with 3 to 40 percent by weight of an organofunctional substituted fluorocarbon compound. The toners are useful for developing photosensitive elements having imagewise tacky and complementary nontacky image areas. The surface coating imparts good toning and clean-up characteristics, together with improved performance on aging.

U.S. Pat. No. 4,973,540 (Machida et al.), the disclosure of which is totally incorporated herein by reference, discloses a developer for developing electrostatic latent images formed on an electrostatic latent image carrier, which comprises a toner including a resin, a colorant, and an inorganic fine particle with at least both a negatively chargeable polar group and a positively chargeable polar group on the surface of the inorganic fine particle.

While known compositions and processes are suitable for their intended purposes, a need remains for improved marking processes. In addition, a need remains for improved ballistic aerosol marking processes. Further, a need remains for ballistic aerosol marking processes in which the possibility of the marking material clogging the printing channels is further reduced. Additionally, a need remains for ballistic aerosol marking processes wherein the marking material does not become undesirably charged. There is also a need for ballistic aerosol marking processes wherein the marking material does not adhere to any of the surfaces within the marking device.

SUMMARY OF THE INVENTION

The present invention is directed to an apparatus for depositing a particulate marking material onto a substrate, comprising (a) a printhead having defined therein at least one channel, each channel having an inner surface and an exit orifice with a width no larger than about 250 microns, the inner surface of each channel having thereon a hydrophobic coating material; (b) a propellant source connected to each channel such that propellant provided by the propellant source can flow through each channel to form propellant streams therein, said propellant streams having kinetic energy, each channel directing the propellant stream through the exit orifice toward the substrate; and (c) a marking material reservoir having an inner surface, said inner surface having thereon the hydrophobic coating material, said reservoir containing particles of a particulate marking material, said reservoir being communicatively connected to each channel such that the particulate marking material from the reservoir can be controllably introduced into the propellant stream in each channel so that the kinetic energy of the propellant stream can cause the particulate marking material to impact the substrate, wherein either (i) the marking material particles of particulate marking material have an outer coating of the hydrophobic coating material; or (ii) the marking material particles have additive particles on the surface thereof, said additive particles having an outer coating of the hydrophobic coating material; or (iii) both the marking material particles and the additive particles have an outer coating of the hydrophobic coating material.

DETAILED DESCRIPTION OF THE INVENTION

To reduce clogging of the channels with particulate marking material in a ballistic aerosol marking apparatus, it has been determined that the marking particles should have low cohesion to themselves, so that they do not stick together. In addition, it has been determined that the marking materials should exhibit little or no triboelectric charging as a result of friction between the particles and the channel and reservoir surfaces of the apparatus. Further, it has been determined that there should be a low coefficient of friction between the particles and the channel and reservoir surfaces, enabling the marking particles to slide efficiently along the channel and reservoir surfaces. The present invention is directed to an apparatus for depositing a particulate marking material onto a substrate, comprising (a) a printhead having defined therein at least one channel, each channel having an inner surface and an exit orifice with a width no larger than about 250 microns, the inner surface of each channel having thereon a hydrophobic coating material; (b) a propellant source connected to each channel such that propellant provided by the propellant source can flow through each channel to form propellant streams therein, said propellant streams having kinetic energy, each channel directing the propellant stream through the exit orifice toward the substrate; and (c) a marking material reservoir having an inner surface, said inner surface having thereon the hydrophobic coating material, said reservoir containing particles of a particulate marking material, said reservoir being communicatively connected to each channel such that the particulate marking material from the reservoir can be controllably introduced into the propellant stream in each channel so that the kinetic energy of the propellant stream can cause the particulate marking material to impact the substrate, wherein either (i) the marking material particles of particulate marking material have an outer coating of the hydrophobic coating material; or (ii) the marking material particles have additive particles on the surface thereof, said additive particles having an outer coating of the hydrophobic coating material; or (iii) both the marking material particles and the additive particles have an outer coating of the hydrophobic coating material. Since the coating material on the channel and reservoir inner surfaces is the same material as that coating the marking particles, triboelectrification between the particles and the channel and reservoir inner surfaces is avoided. In addition, since the surface additive particles on the marking material particles are the dominant factor affecting flow properties and surface charging of the marking material, it can be sufficient to coat only the surface additive particles with the hydrophobic coating. These coatings also reduce particle cohesion in the marking material and reduce the coefficient of friction between the marking particles and the channel and reservoir walls.

In the following detailed description, numeric ranges are provided for various aspects of the embodiments described, such as pressures, velocities, widths, lengths, and the like. These recited ranges are to be treated as examples only, and are not intended to limit the scope of the claims hereof. In addition, a number of materials are identified as suitable for various aspects of the embodiments, such as for marking materials, propellants, body structures, and the like. These recited materials are also to be treated as exemplary, and are not intended to limit the scope of the claims hereof.

With reference now to FIG. 1, shown therein is a schematic illustration of a ballistic aerosol marking device 10 according to one embodiment of the present invention. As shown therein, device comprises one or more ejectors 12 to which a propellant 14 is fed. A marking material 16, which can be transported by a transport 18 under the control of control 20, is introduced into ejector 12. (Optional elements are indicated by dashed lines.) The marking material is metered (that is controllably introduced) into the ejector by metering device 21, under control of control 22. The marking material ejected by ejector 12 can be subject to post ejection modification 23, optionally also part of device 10. Each of these elements will be described in further detail below. It will be appreciated that device 10 can form a part of a printer, for example of the type commonly attached to a computer network, personal computer or the like, part of a facsimile machine, part of a document duplicator, part of a labelling apparatus, or part of any other of a wide variety of marking devices.

Figure 1:
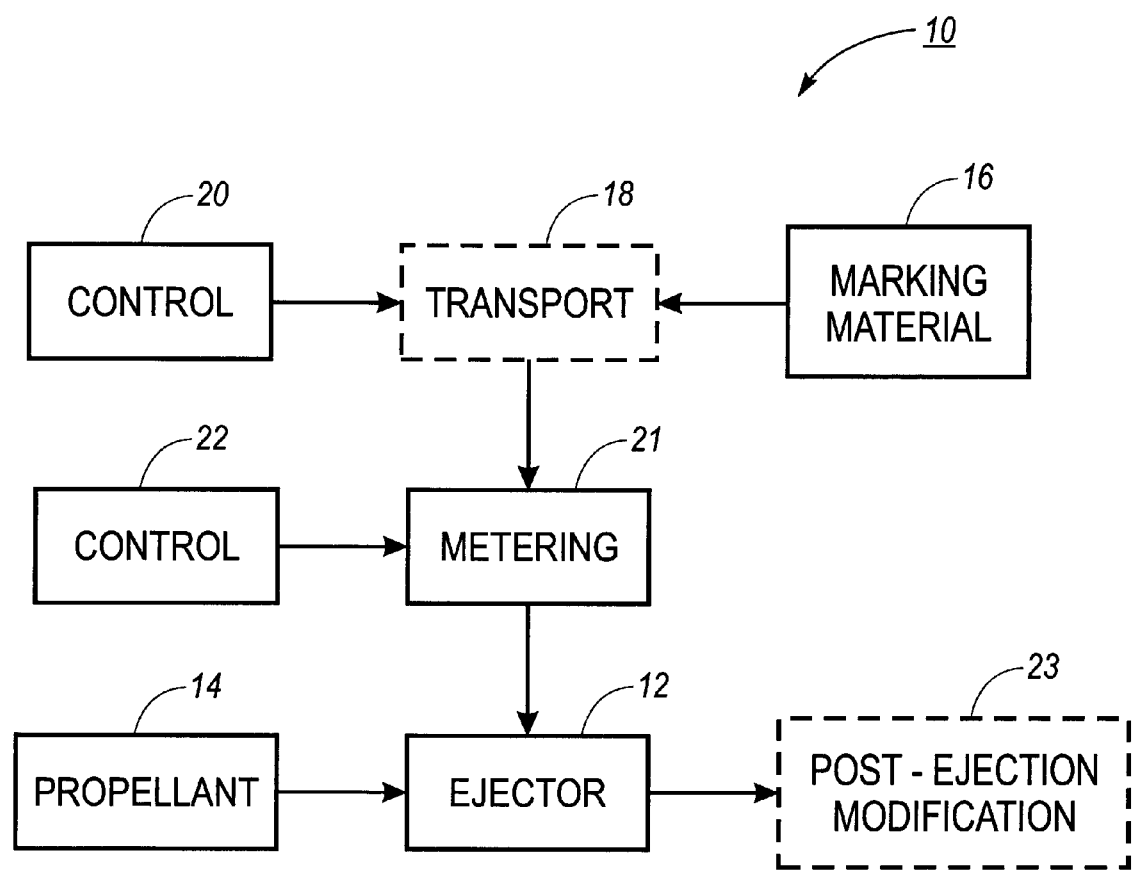
FIG. 1 is a schematic illustration of a system for marking a substrate according to the present invention.
Figure 2:
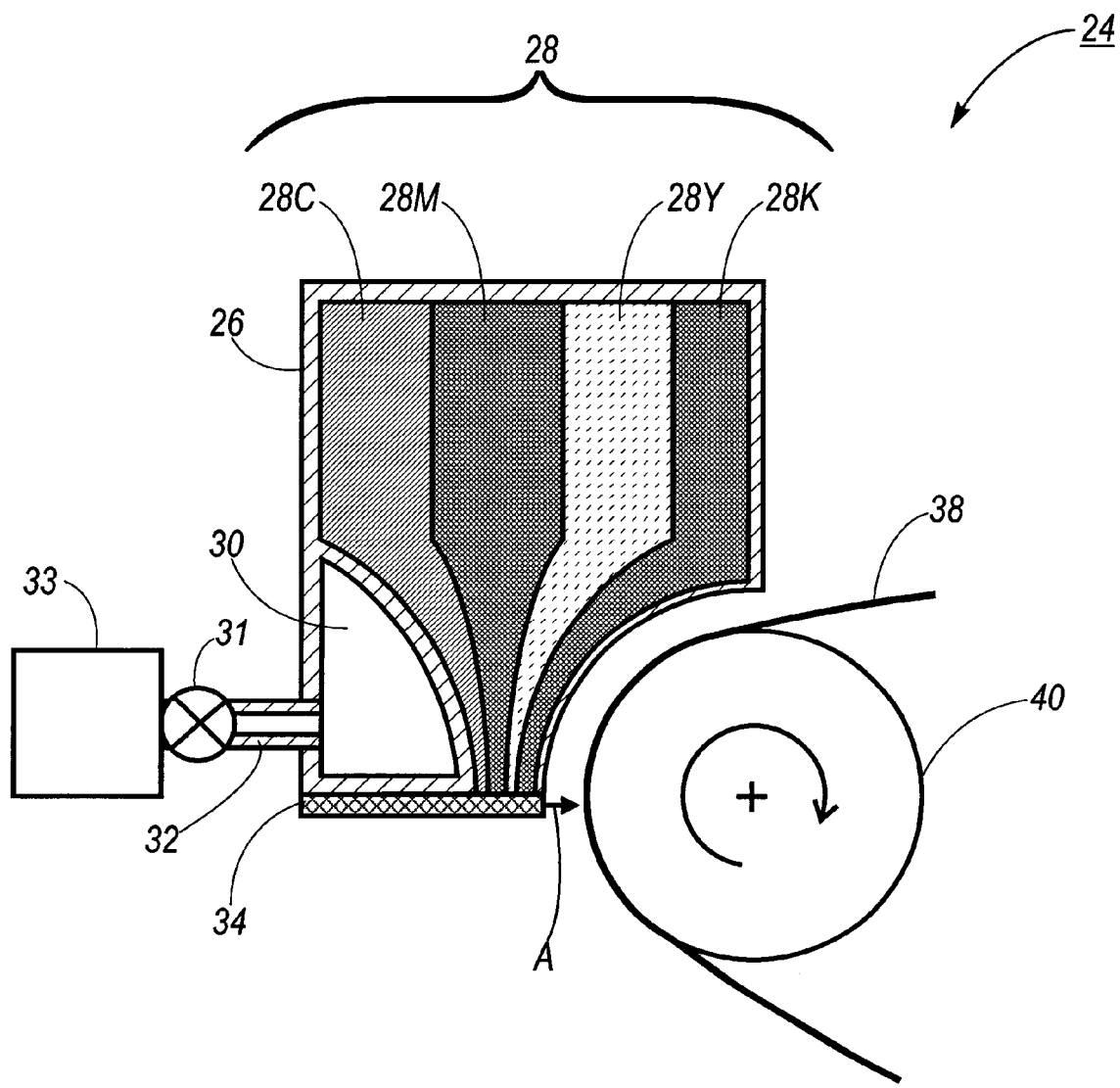
FIG. 2 is cross sectional illustration of a marking apparatus according to one embodiment of the present invention.

The embodiment illustrated in FIG. 1 can be realized by a ballistic aerosol marking device 24 of the type shown in the cut-away side view of FIG. 2. According to this embodiment, the materials to be deposited will be four colored marking materials, for example cyan (C), magenta (M), yellow (Y), and black (K), of a type described further herein, which can be deposited concomitantly, either mixed or unmixed, successively, or otherwise. While the illustration of FIG. 2 and the associated description contemplates a device for marking with four colors (either one color at a time or in mixtures thereof), a device for marking with a fewer or a greater number of colors, or other or additional materials, such as materials creating a surface for adhering marking material particles (or other substrate surface pretreatment), a desired substrate finish quality (such as a matte, satin or gloss finish or other substrate surface post-treatment), material not visible to the unaided eye (such as magnetic particles, ultra violet-fluorescent particles, and the like) or other material associated with a marked substrate, is clearly contemplated herein.

Device 24 comprises a body 26 within which is formed a plurality of cavities 28C, 28M, 28Y, and 28K (collectively referred to as cavities 28) for receiving materials to be deposited. Also formed in body 26 can be a propellant cavity 30. A fitting 32 can be provided for connecting propellant cavity 30 to a propellant source 33 such as a compressor, a propellant reservoir, or the like. Body 26 can be connected to a print head 34, comprising, among other layers, substrate 36 and channel layer 37.

Figure 3:
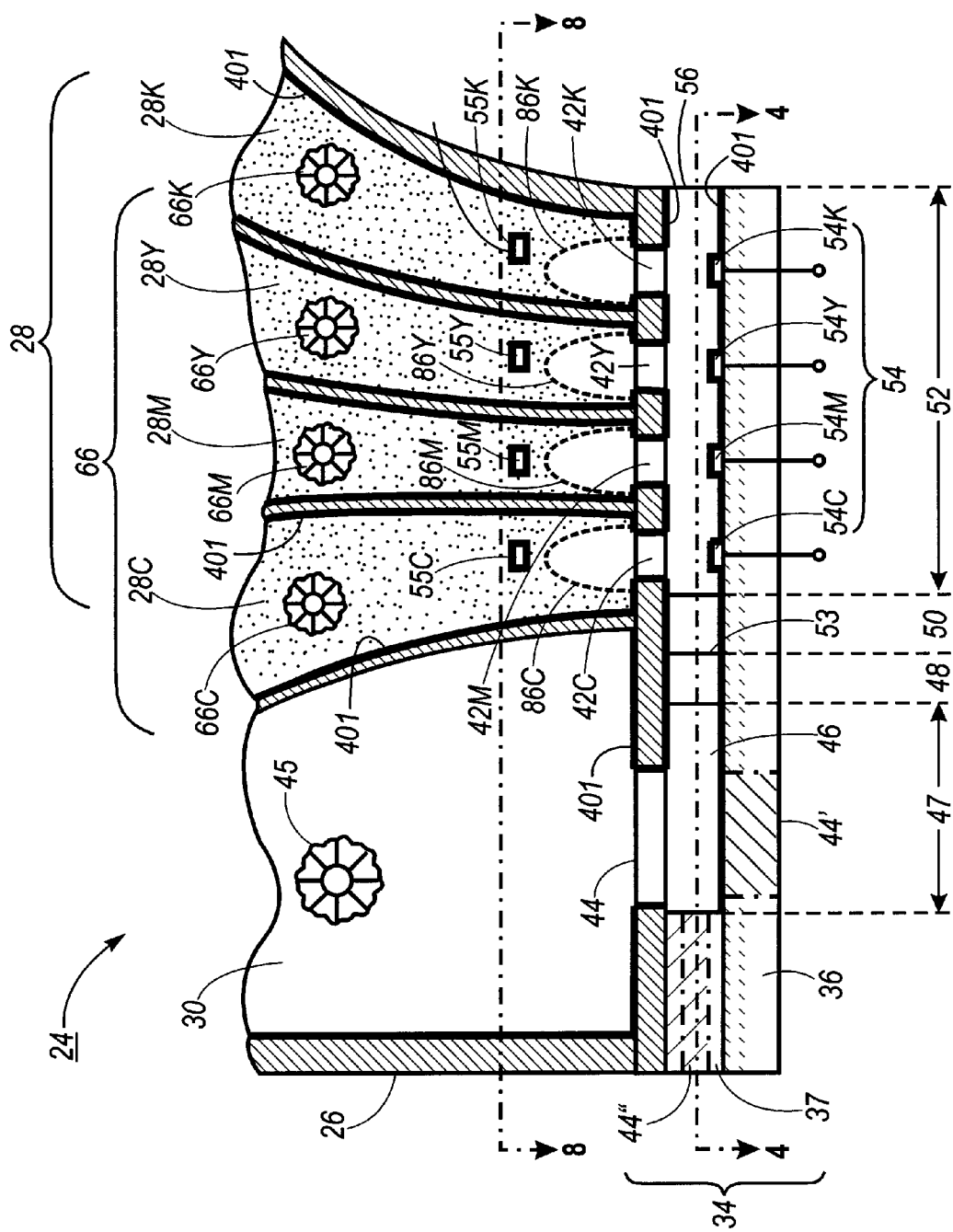
FIG. 3 is another cross sectional illustration of a marking apparatus according to one embodiment of the present invention.

With reference now to FIG. 3, shown therein is a cut-away cross section of a portion of device 24. Each of cavities 28 include a port 42C, 42M, 42Y, and 42K (collectively referred to as ports 42) respectively, of circular, oval, rectangular, or other cross-section, providing communication between said cavities, and a channel 46 which adjoins body 26. Ports 42 are shown having a longitudinal axis roughly perpendicular to the longitudinal axis of channel 46. The angle between the longitudinal axes of ports 42 and channel 46, however, can be other than 90 degrees, as appropriate for the particular application of the present invention.

Likewise, propellant cavity 30 includes a port 44, of circular, oval, rectangular, or other cross-section, between said cavity and channel 46 through which propellant can travel. Alternatively, print head 34 can be provided with a port 44' in substrate 36 or port 44" in channel layer 37, or combinations thereof, for the introduction of propellant into channel 46. As will be described further below, marking material is caused to flow out from cavities 28 through ports 42 and into a stream of propellant flowing through channel 46. The marking material and propellant are directed in the direction of arrow A toward a substrate 38, for example paper, supported by a platen 40, as shown in FIG. 2. It has been demonstrated that a propellant marking material flow pattern from a print head employing a number of the features described herein can remain relatively collimated for a distance of up to 10 millimeters, with an optimal printing spacing on the order of between one and several millimeters. For example, the print head can produce a marking material stream which does not deviate by more than about 20 percent, and preferably by not more than about 10 percent, from the width of the exit orifice for a distance of at least 4 times the exit orifice width. The appropriate spacing between the print head and the substrate, however, is a function of many parameters, and does not itself form a part of the present invention. In one preferred embodiment, the kinetic energy of the particles, which are moving at very high velocities toward the substrate, is converted to thermal energy upon impact of the particles on the substrate, thereby fixing or fusing the particles to the substrate. In this embodiment, the glass transition temperature of the resin in the particles is selected so that the thermal energy generated by impact with the substrate is sufficient to fuse the particles to the substrate; this process is called kinetic fusing.

According to one embodiment of the present invention, print head 34 comprises a substrate 36 and channel layer 37 in which is formed channel 46. Additional layers, such as an insulating layer, capping layer, or the like (not shown) can also form a part of print head 34. Substrate 36 is formed of a suitable material such as glass, ceramic, or the like, on which (directly or indirectly) is formed a relatively thick material, such as a thick permanent photoresist (for example, a liquid photosensitive epoxy such as SU-8, commercially available from Microlithography Chemicals, Inc.; see also U.S. Pat. No. 4,882,245, the disclosure of which is totally incorporated herein by reference) and/or a dry film-based photoresist such as the Riston photopolymer resist series, commercially available from DuPont Printed Circuit Materials, Research Triangle Park, N.C. which can be etched, machined, or otherwise in which can be formed a channel with features described below. In one embodiment, subsequent to the formation of channel 46, substrate 34 can be surface treated with hydrophobic coating material 401. In another embodiment, hydrophobic coating material 401 can be applied to substrate 34 prior to or during formation of channel 46.

Figure 4:
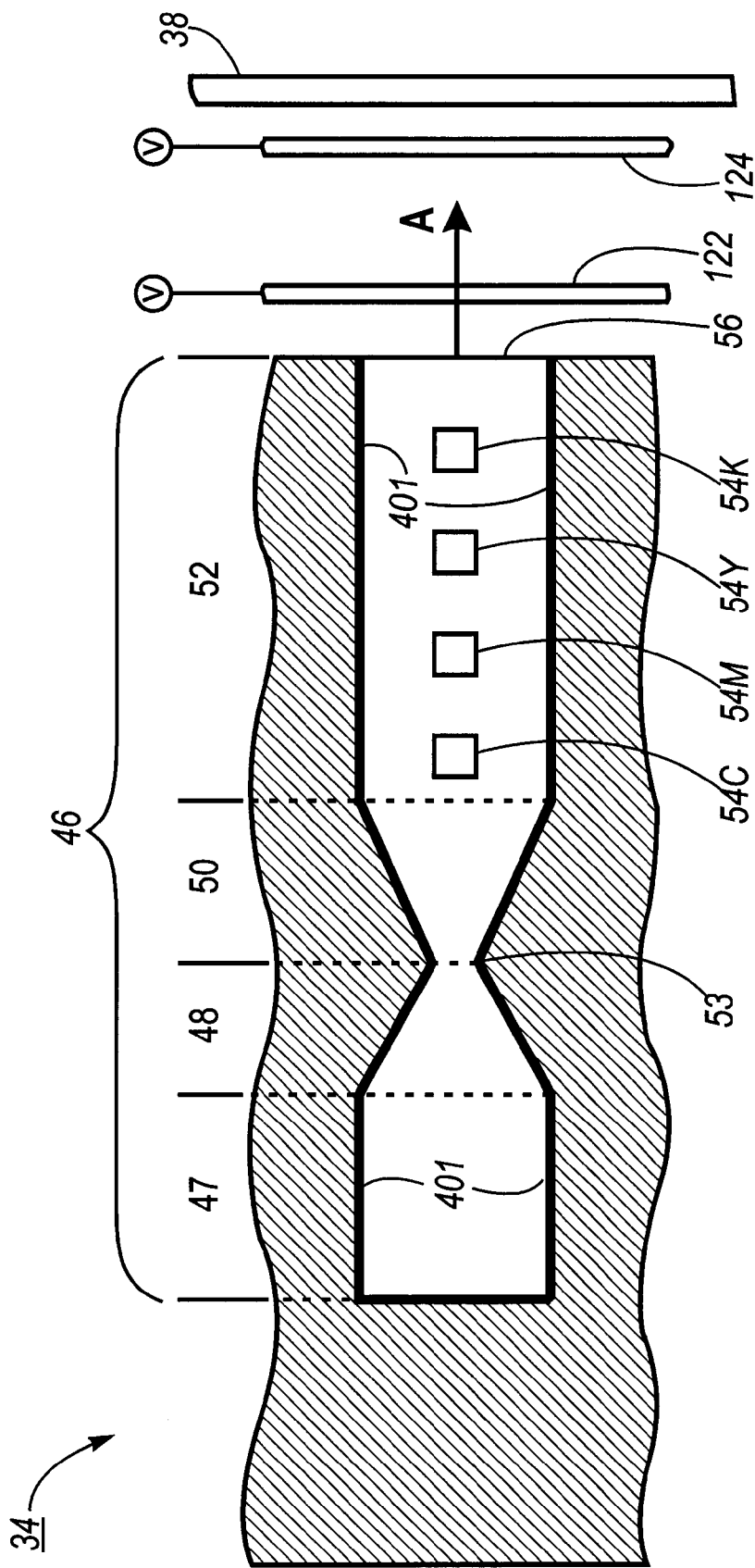
FIG. 4 is a plan view of one channel, with nozzle, of the marking apparatus shown in FIG. 3.

Referring now to FIG. 4, which is a cut-away plan view of print head 34, in one embodiment channel 46 is formed to have at a first, proximal end a propellant receiving region 47, an adjacent converging region 48, a diverging region 50, and a marking material injection region 52. The point of transition between the converging region 48 and diverging region 50 is referred to as throat 53, and the converging region 48, diverging region 50, and throat 53 are collectively referred to as a nozzle. The general shape of such a channel is sometimes referred to as a de Laval expansion pipe or a venturi convergence/divergence structure. An exit orifice 56 is located at the distal end of channel 46.

Figure 5A:
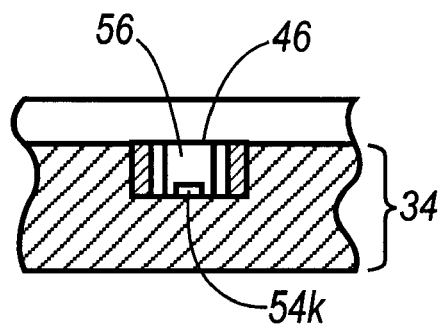
FIGS. 5A through 5C and 6A through 6C are cross sectional views, in the longitudinal direction, of several examples of channels according to the present invention.
Figure 5B:
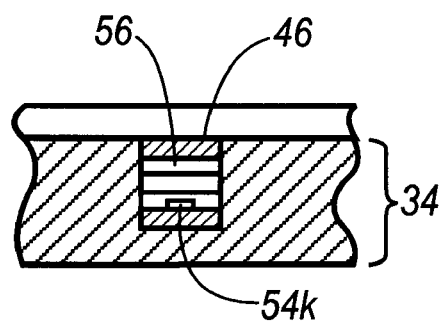
Figure 5C:
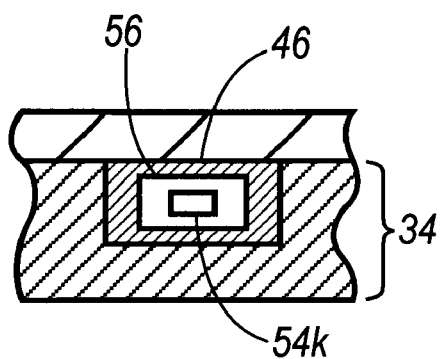
Figure 6A:
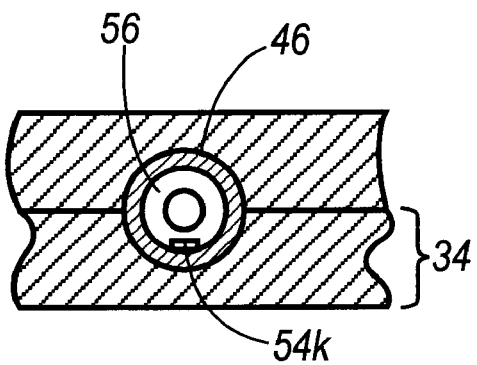
Figure 6B:
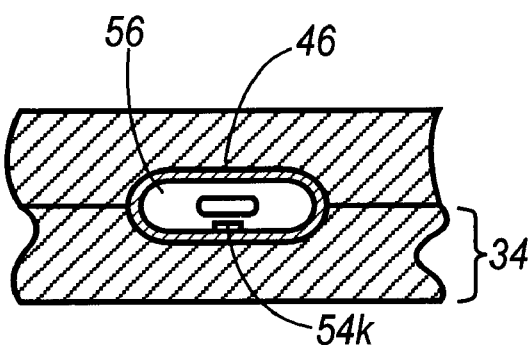
Figure 6C:
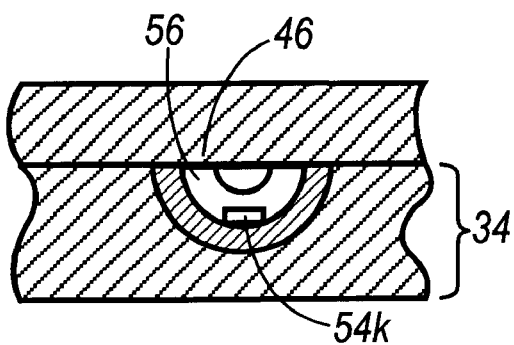

In the embodiment of the present invention shown in FIGS. 3 and 4, region 48 converges in the plane of FIG. 4, but not in the plane of FIG. 3, and likewise region 50 diverges in the plane of FIG. 4, but not in the plane of FIG. 3. Typically, this divergence determines the cross-sectional shape of the exit orifice 56. For example, the shape of orifice 56 illustrated in FIG. 5A corresponds to the device shown in FIGS. 3 and 4. However, the channel can be fabricated such that these regions converge/diverge in the plane of FIG. 3, but not in the plane of FIG. 4 (illustrated in FIG. 5B), or in both the planes of FIGS. 3 and 4 (illustrated in FIG. 5C), or in some other plane or set of planes, or in all planes (examples illustrated in FIGS. 6A through 6C) as can be determined by the manufacture and application of the present invention.

Figure 7:
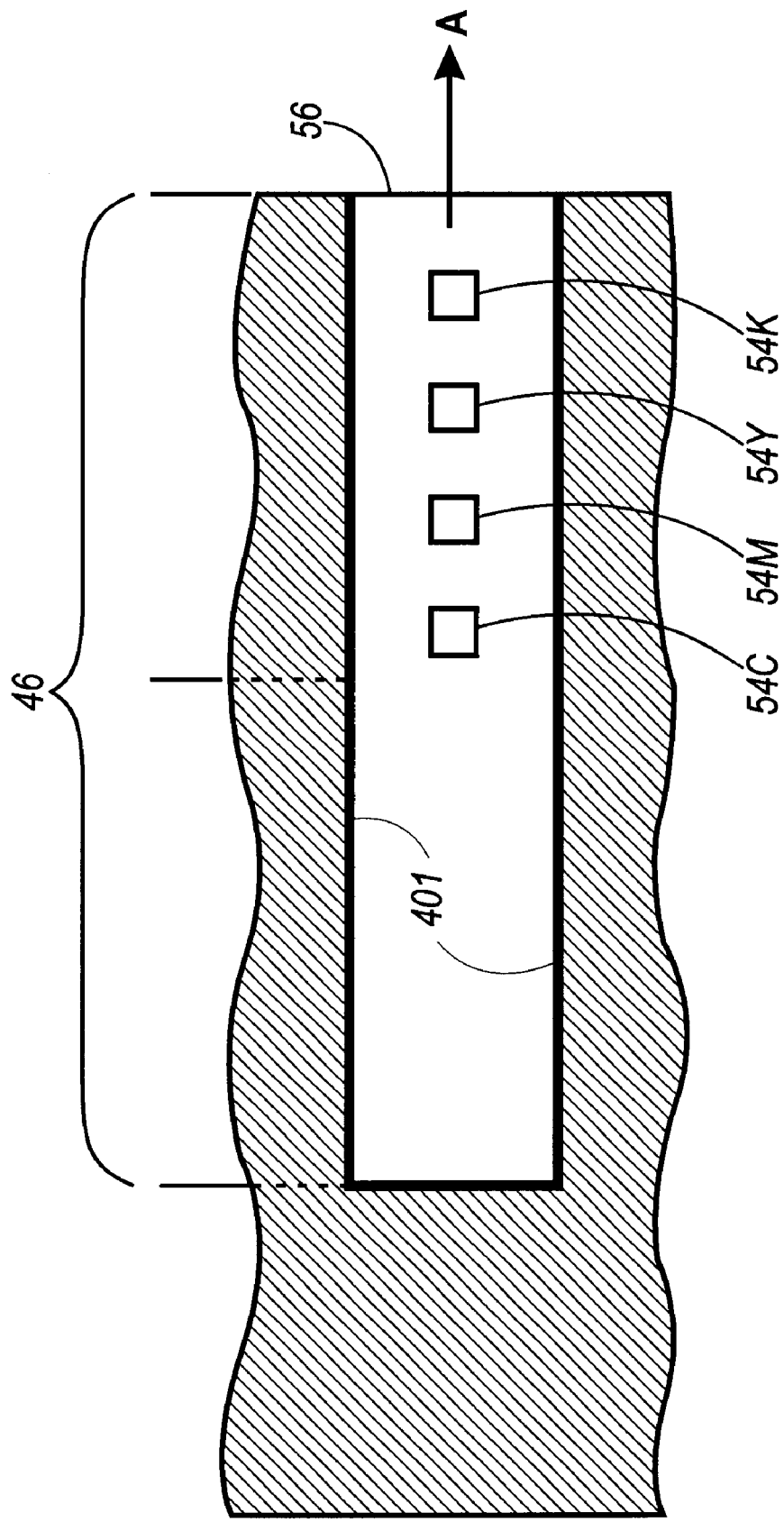
FIG. 7 is another plan view of one channel of a marking apparatus, without a nozzle, according to the present invention.
Figure 8A:
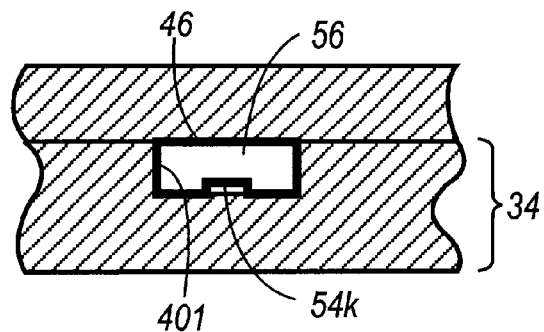
FIGS. 8A through 8D are cross sectional views, along the longitudinal axis, of several additional examples of channels according to the present invention.
Figure 8B:
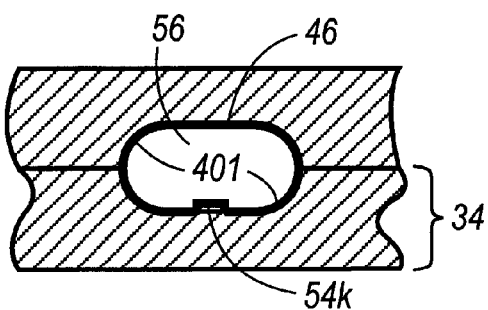
Figure 8C:
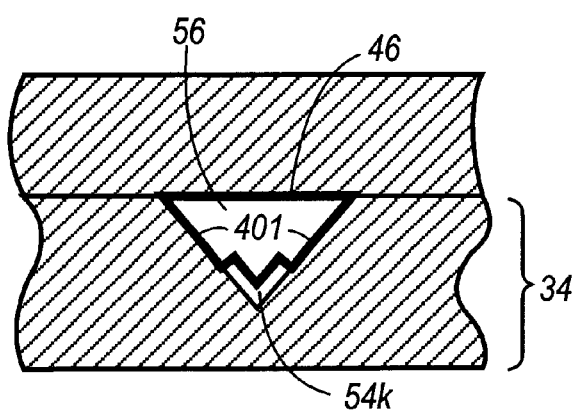
Figure 8D:
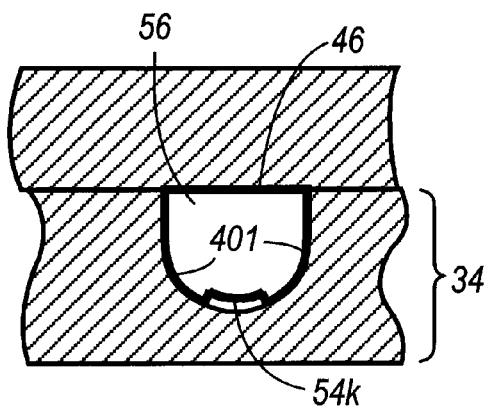

In another embodiment, shown in FIG. 7, channel 46 is not provided with a converging and diverging region, but rather has a uniform cross section along its axis. This cross section can be rectangular or square (illustrated in FIG. 8A), oval or circular (illustrated in FIG. 8B), or other cross section (examples are illustrated in FIGS. 8C and 8D), as can be determined by the manufacture and application of the present invention.

Referring again to FIG. 3, propellant enters channel 46 through port 44, from propellant cavity 30, roughly perpendicular to the long axis of channel 46. According to another embodiment, the propellant enters the channel parallel (or at some other angle) to the long axis of channel 46 by, for example, ports 44' or 44" or other manner not shown. The propellant can flow continuously through the channel while the marking apparatus is in an operative configuration (for example, a "power on" or similar state ready to mark), or can be modulated such that propellant passes through the channel only when marking material is to be ejected, as dictated by the particular application of the present invention. Such propellant modulation can be accomplished by a valve 31 interposed between the propellant source 33 and the channel 46, by modulating the generation of the propellant for example by turning on and off a compressor or selectively initiating a chemical reaction designed to generate propellant, or the like.

Marking material can controllably enter the channel through one or more ports 42 located in the marking material injection region 52. That is, during use, the amount of marking material introduced into the propellant stream can be controlled from zero to a maximum per spot. The propellant and marking material travel from the proximal end to a distal end of channel 46 at which is located exit orifice 56.

According to one embodiment for metering the marking material, the marking material includes material which can be imparted with an electrostatic charge. For example, the marking material can comprise a pigment suspended in a binder together with charge directors. The charge directors can be charged, for example by way of a corona 66C, 66M, 66Y, and 66K (collectively referred to as coronas 66), located in cavities 28, shown in FIG. 3. Another option is initially to charge the propellant gas, for example, by way of a corona 45 in cavity 30 (or some other appropriate location such as port 44 or the like.) The charged propellant can be made to enter into cavities 28 through ports 42, for the dual purposes of creating a fluidized bed 86C, 86M, 86Y, and 86K (collectively referred to as fluidized bed 86), and imparting a charge to the marking material. Other options include tribocharging, by other means external to cavities 28, or other mechanism.

Formed at one surface of channel 46, opposite each of the ports 42 are electrodes 54C, 54M, 54Y, and 54K (collectively referred to as electrodes 54). Formed within cavities 28 (or some other location such as at or within ports 44) are corresponding counter-electrodes 55C, 55M, 55Y, and 55K (collectively referred to as counter-electrodes 55). When an electric field is generated by electrodes 54 and counter-electrodes 55, the charged marking material can be attracted to the field, and exits cavities 28 through ports 42 in a direction roughly perpendicular to the propellant stream in channel 46. The shape and location of the electrodes and the charge applied thereto determine the strength of the electric field, and accordingly determine the force of the injection of the marking material into the propellant stream. In general, the force injecting the marking material into the propellant stream is chosen such that the momentum provided by the force of the propellant stream on the marking material overcomes the injecting force, and once into the propellant stream in channel 46, the marking material travels with the propellant stream out of exit orifice 56 in a direction towards the substrate.

In the event that fusing assistance is required (for example, when an elastic substrate is used, when the marking material particle velocity is low, or the like), a number of approaches can be employed. For example, one or more heated filaments 122 can be provided proximate the ejection port 56 (shown in FIG. 4), which either reduces the kinetic energy needed to melt the marking material particle or in fact at least partly melts the marking material particle in flight. Alternatively, or in addition to filament 122, a heated filament 124 can be located proximate substrate 38 (also shown in FIG. 4) to have a similar effect.

The hydrophobic coating material 401 is preferably applied to the inner surface of each channel 46 in at least those areas thereof that come into contact with the marking material particles. Preferably, the hydrophobic coating material is applied to all surfaces in the apparatus that will come into contact with the marking material, including the walls of cavities 28, the surface of the substrate 36, the surface of any portion of channel layer 37 that may contact the marking material particles, the surfaces of body 26 that define channel 46, the surfaces of ports 42, and the like. In addition, the hydrophobic coating material can, if desired, also be applied to optional electrodes 54 and optional counter-electrodes 55. Preferably, the hydrophobic coating material is also applied to any conduits or intermediate structures that might be situated between cavities 28 and channel 46. It is not necessary to apply hydrophobic coating 401 to those surfaces of the apparatus that do not come into contact with the marking material; for ease of application, however, the hydrophobic coating can, if desired, also be applied to other areas of the apparatus. For example, as shown in FIG. 3, hydrophobic coating 401 is unnecessary at port 44, inside cavity 30, or in channel 46 upstream of port 42C, but with commonly used coating methods, it may be easier to apply coating 401 to these areas than to leave them uncoated, and the coating 401 has no detrimental effect if applied in unneeded areas.

While FIGS. 4 to 8 illustrate a print head 34 having one channel therein, it will be appreciated that a print head according to the present invention can have an arbitrary number of channels, and range from several hundred micrometers across with one or several channels, to a page-width (for example, 8.5 or more inches across) with thousands of channels. The width W of each exit orifice 56 can be on the order of 250 $\mu$m or smaller, preferably in the range of 100 $\mu$m or smaller. The pitch P, or spacing from edge to edge (or center to center) between adjacent exit orifices 56 can also be on the order of 250 $\mu$m or smaller, preferably in the range of 100 $\mu$m or smaller in non-staggered array. In a two-dimensionally staggered array, the pitch can be further reduced.

Figure 9:
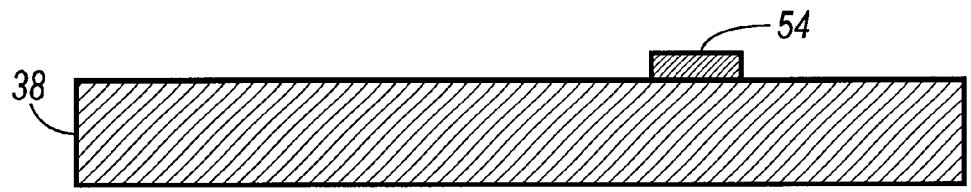
FIGS. 9 through 14 are illustrations of one process for producing a print head according to the present invention.

Print head 34 can be formed by one of a wide variety of methods. As an example, and with reference to FIGS. 9 through 14, print head 34 can be manufactured as follows. Initially, a substrate 38, for example an insulating substrate such as glass or a semi-insulating substrate such as silicon, or alternatively an arbitrary substrate coated with an insulating layer, is cleaned and otherwise prepared for lithography. One or more metal electrodes 54 can be formed on (for example, photolithographically) or applied to a first surface of substrate 38, which shall form the bottom of a channel 46. This stage is illustrated in FIG. 9.

Figure 10:
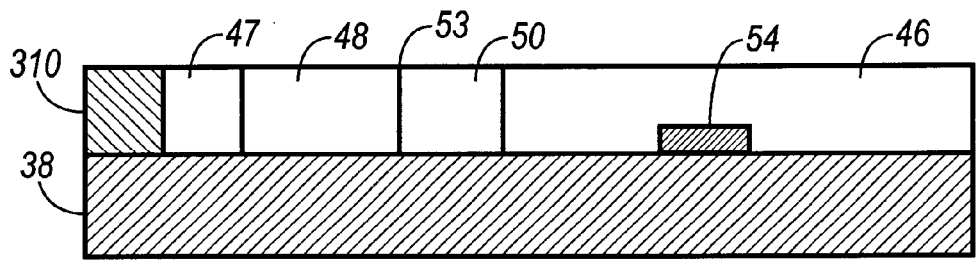
Figure 11:
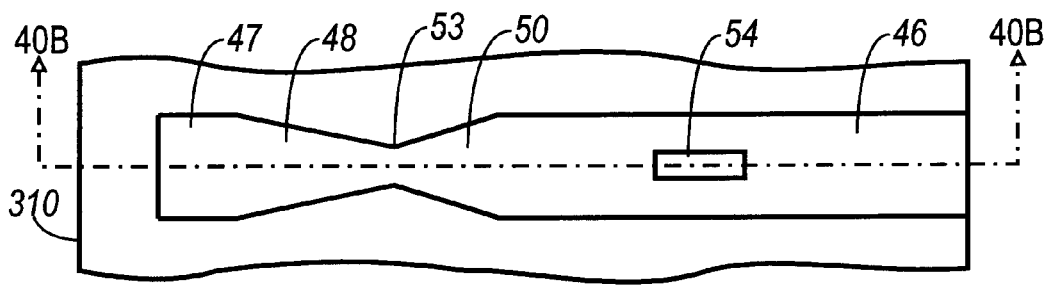

Next, a thick photoresist such as the aforementioned SU-8 is coated over substantially the entire substrate, typically by a spin-on process, although layer 310 can be laminated as an alternative. Layer 310 will be relatively quite thick, for example on the order of 100 μm or thicker. This stage is illustrated in FIG. 10. Well known processes such as lithography, ion milling, or the like, are next employed to form a channel 46 in layer 310, preferably with a converging region 48, diverging region 50, and throat 53. The structure at this point is shown in a plan view in FIG. 11.

At this point, one alternative is to machine an inlet 44' (shown in FIG. 3) for propellant through the substrate in propellant receiving region 47. This result can be accomplished by diamond drilling, ultrasonic drilling, or other techniques well known in the art as a function of the selected substrate material. Alternatively, a propellant inlet 44" (shown in FIG. 3) can be formed in layer 310. However, a propellant inlet 44 can be formed in a subsequently applied layer, as described following.

Figure 12:
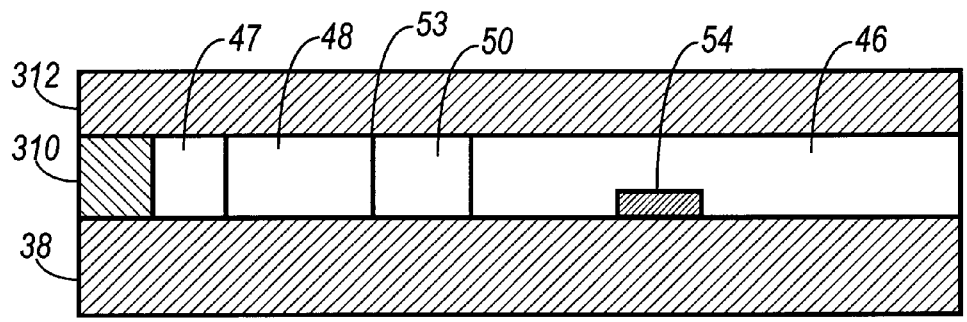

Applied directly on top of layer 310 is another relatively thick layer of photoresist 312, preferably the aforementioned Riston or similar material. Layer 312 is preferably on the order of 100 μm thick or thicker, and is preferably applied by lamination, although it can alternatively be spun on or otherwise deposited. Layer 312 can alternatively be glass (such as Corning 7740) or other appropriate material bonded to layer 310. The structure at this point is illustrated in FIG. 12.

Figure 13:
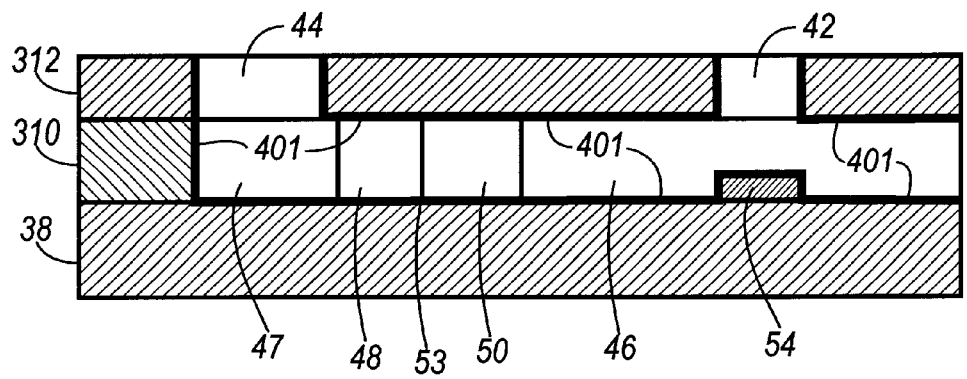

Layer 312 is then patterned, for example by photolithography, ion milling, or the like to form ports 42 and 44. Layer 312 can also be machined, or otherwise patterned by methods known in the art. The structure at this point is shown in FIG. 13.

At this point, hydrophobic coating material 401 can be applied to the interior surfaces of the entire structure, including channel 46 and marking material ports 42.

One alternative to the above is to form channel 46 directly in the substrate, for example by photolithography, ion milling, or the like. Layer 312 can still be applied as described above, followed by the above described surface treatment with the hydrophobic coating material. Still another alternative is to form the print head from acrylic, or similar moldable and/or machinable material with channel 46 molded or machined therein. In addition to the above, layer 312 can also be a similar material in this embodiment, bonded to the remainder of the structure. In this embodiment, the interior surfaces of the structure such as channel 46 and marking material ports 42 can be surface treated after completion of the machining and bonding steps.

Figure 14:
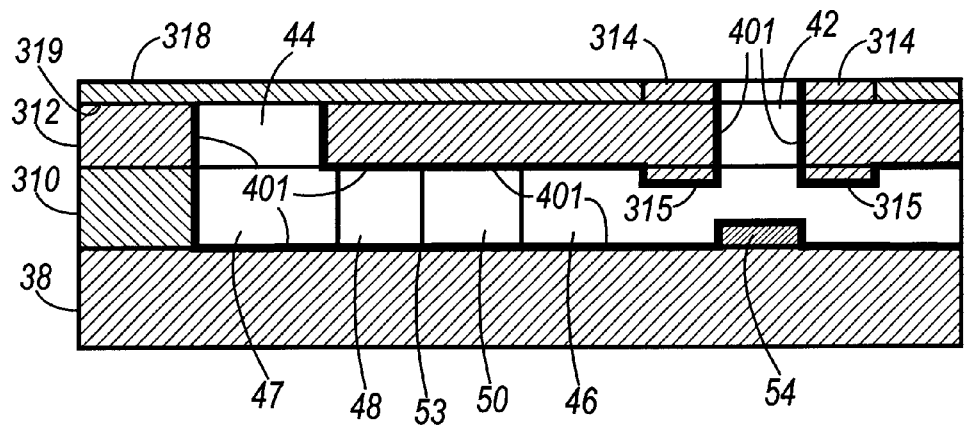

A supplement to the above is to preform electrodes 314 and 315, which can be rectangular, annular (shown), or other shape in plan form, on layer 312 prior to applying layer 312 over layer 310. In this embodiment, port 42, and possible port 44, will also be preformed prior to application of layer 312. Electrodes 314 can be formed by sputtering, lift-off, or other techniques, and can be any appropriate metal such as aluminum or the like. A dielectric layer 316 can be applied to protect the electrodes 314 and provide a planarized upper surface 318. A second dielectric layer (not shown) can similarly be applied to a lower surface 319 of layer 312 similarly to protect electrode 315 and provide a planarized lower surface. The structure of this embodiment is shown in FIG. 14. Alternatively, the second dielectric layer can be the hydrophobic coating material, which can be applied to all of the interior surfaces of the device, including channel 46, marking material ports 42, and electrodes 315 and 54. In yet another embodiment, the hydrophobic surface treatment can be applied over the dielectric layer or layers.

The surfaces in the ballistic aerosol marking apparatus to be coated with the hydrophobic material are of any suitable material. Examples of suitable surface materials to be coated include silicon, silica (glass), crystalline silica (quartz), ceramics, polymers, metals, metal oxides, and the like. Particularly preferred polymers include epoxies, photoresistive polymers, polymers containing vinyl or diene substituents, and polymers containing reactive side chain or terminal end groups, such as acid groups, ester groups, hydroxyl groups, cyano groups, or amine groups. Preferred metals include iron, titanium, nickel, copper, zirconium, aluminum, platinum, and gold.

The coating employed in the apparatus and on the marking material of the present invention can be any suitable hydrophobic material. Suitable hydrophobic materials include those that will provide an advancing contact angle with water that is greater than about 80 degrees, and preferably greater than about 90 degrees, when applied to the surface of the material to be coated, although the advancing contact angle can be outside of these ranges. The surface energy of the hydrophobic coating preferably is less than about 50 milliJoules per square meter, and more preferably is less than about 40 milliJoules per square meter, although the surface energy can be outside of these ranges.

Examples of suitable hydrophobic materials to be coated onto silica or ceramic surfaces include alkanes and fluoroalkanes (including both perfluoroalkanes and alkanes having both hydrogen atoms and fluorine atoms attached to the carbon atoms thereof) bonded to the surface through an oxygen atom. These coatings can be applied by reacting the surface with the corresponding alcohols, such as butanol, propanol, decanol, octadecyl alcohol, and the like, including fluorinated alcohols, such as trifluoroethanol, heptafluorobutanol, hexafluoropropanol, tridecafluorooctanol, and the like, all available from Aldrich Chemical Company, Milwaukee, Wis. The reaction with the surface can be done by the well know methods in the art, such as by heating the alcohol and substrate in an autoclave under pressure, or in vacuum. These same treatment agents can also be utilized in a similar manner with a polymer containing a suitable functional group to react with the alcohol, such as a side chain acid group or ester group.

For applying the hydrophobic coating to silicon surfaces, the silicon surface often contains surface hydroxyl groups that facilitate surface treatment. In other embodiments, the silicon surface can be pretreated by oxidation with any standard method known in the art preparatory to the above described surface hydrophobic treatment. As an example of a suitable oxidation pre-treatment, the silicon can be first treated with a 3:1 mixture by weight of concentrated sulfuric acid and 3 weight percent hydrogen peroxide at about 100° C. for about 2 hours, followed by water rinsing, followed by treatment with a 1:1 mixture by weight of concentrated ammonium hydroxide and 30 weight percent hydrogen peroxide for about 15 minutes.

Also for a silicon substrate, the above oxidized surface can be treated further with 40 weight percent aqueous ammonium fluoride (for Si(111) surfaces) or 10 weight percent aqueous hydrofluoric acid (for Si(100) surfaces) to form Si—H moieties on the surface. The pretreated surface can then be heated with a diacyl peroxide (including fluorodiacyl peroxides) such as those of the general formula $(R—CO_2)_2$, wherein R is an alkyl or fluoroalkyl substituent, such as $—C_3F_7$, $H(CF_2)_4—$, $H_7C_3OCF(CF_3)—$, or the like, wherein the preparation is as described by Cheng Xue et al., *Journal of Organic Chemistry*, 47, 2009–2013 (1982), the disclosure of which is totally incorporated herein by reference). The resultant coating is a surface attached alkane or fluoroalkane. Alternatively, the pretreated surface with Si—H moieties can be treated by heating the substrate with an alkyl halide (said class of materials including fluoroalkyl halides), preferably a fluoroalkyl iodide, such as perfluoroethyl iodide, perfluorohexyl iodide, or perfluorodecyl iodide, available from Aldrich Chemical Company, under pressure or in vacuum. The resultant coating is a surface attached alkane or fluoroalkane.

For hydrophobic treatment of polymers containing reactive vinyl or diene groups, the polymer can be treated by heating the substrate and an alkyl or fluoroalkyl halide, preferably a fluoroalkyl iodide, such as perfluoroethyl iodide, perfluorobutyl iodide, perfluorohexyl iodide, or perfluorodecyl iodide, available from Aldrich Chemical Company, under pressure or in vacuum. The resultant coating is a surface grafted alkane or fluoroalkane.

For hydrophobic treatment of polymers containing hydroxyl groups, the polymer can be treated by heating the substrate with an acid halide of the formula R—(CO)—X, wherein R is an alkyl or fluoroalkyl group and X is a halogen atom, such as heptafluorobutyryl chloride or butanoyl chloride, available from Aldrich Chemical Co. The resultant coating is a surface attached alkane or fluoroalkane moiety bound to the surface through the carbon atom of the CO group.

For hydrophobic treatment of metal surfaces, the metal surface can be treated by exposure of the metal surface at room temperature or at elevated temperature to an alkyl thiol (said class of materials including fluoroalkyl thiols), such as butanethiol, heptanethiol, or decanethiol, available from Aldrich Chemical Company. The resultant coating is a surface attached alkane or fluoroalkane bound to the surface through a sulfur atom.

One preferred class of hydrophobic materials is that of silane monomers and polymers. The silanating agent typically is of the formula

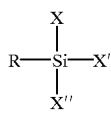

wherein R is a non-reactive, preferably hydrophobic group, such as an alkyl group (including both linear and branched alkyl groups), typically with from 1 to about 25 carbon atoms, preferably with from 1 to about 10 carbon atoms, and more preferably with from 1 to about 3 carbon atoms, a fluoroalkyl group (including both linear and branched fluorinated alkyl groups, and both perfluoroalkyl groups and alkyl groups having both carbon-hydrogen bonds and carbon-fluorine bonds), typically with from 1 to about 25 carbon atoms, preferably with from 1 to about 10 carbon atoms, and more preferably with from 1 to about 3 carbon atoms, or a heteroalkyl group (linear or branched) containing a chain typically having from 1 to about 25 atoms, and preferably having from 1 to about 6 atoms, with suitable heteroatoms including but not limited to silicon, nitrogen, oxygen, boron, phosphorus, fluorine, chlorine, or the like, X is a halogen atom, such as fluorine, chlorine, bromine, or iodine atoms, or an alkoxy group, said alkoxy group typically having from 1 to about 25 carbon atoms, and preferably from 1 to about 6 carbon atoms, although the number of carbon atoms can be outside of these ranges, and X' and X" are each, independently of the other, halogen atoms, alkoxy groups, alkyl groups, or fluoroalkyl groups, said alkoxy, alkyl, or fluoroalkyl groups typically having from 1 to about 25 carbon atoms, and preferably from 1 to about 6 carbon atoms, although the number of carbon atoms can be outside of these ranges. Nitrogen heteroatoms, while suitable, are less preferred, particularly when the nitrogen atom has one or more bonds to hydrogen atoms, since the N—H groups may form hydrogen bonds that can increase adhesion of the marking material particles to the printing apparatus surfaces, increase the dispersive surface energy, and decrease the hydrophobicity of the surface. Preferred R groups have hydrogen, fluorine, and/or methyl groups on the main chain thereof. Most preferred are fluoroalkyl groups, since the fluorine to hydrogen ratio can be adjusted to adjust the surface energy.

If only X is alkoxy or halide, only a surface bond is formed and the resulting coating is of a monomeric silane material. Such a surface bond can produce a robust surface hydrophobic layer on the coated surface if the surface to be coated has suitable reactive groups, such as silanol groups on a glass surface, that can react with the silanating agent. Such surface bonds will also result in a very thin coating layer, comprising a single monolayer of the silanating agent, and will thus have a thickness determined by the molecular size of the silanating agent. In preferred embodiments, the silanating agent is capable of reaction with itself to form an integral surface layer of the corresponding polysilane. If all three of X, X', and X" are alkoxy or halide, a three-dimensional crosslinked structure will be formed on the coated surface. In this embodiment, the surface hydrophobic coating layer can be prepared to be a thin single monolayer of the silane polymer, or can be prepared as a thick three dimensional polymer coating. If only X and X' are alkoxy or halide, a two-dimensional polymer will be formed on the coated surface. To ensure the surface integrity of the coating layer, it is generally preferred that all of X, X', and X" be alkoxy groups of a carbon chain length of from 1 to about 6 atoms, as, for example, methoxy, ethoxy, propoxy, or butoxy groups, or halogen atoms, as, for example, fluorine, chloride, bromine, or iodine.

Examples of suitable silanating reactants or polysilane precursors include trifluoropropyl trichlorosilane, trifluoropropyl triethoxysilane, tridecafluoro-1,1,2,2,-tetrahydrooctyl-1-trichlorosilane, tridecafluoro-1,1,2,2,-tetrahydrooctyl-1-triethoxysilane, tridecafluoro-1,1,2,2-tetrahydrooctyl-1-methyl-1-dichlorosilane, heptadecafluoro-1,1,2,2-tetrahydrodecyl-1-trimethoxysilane, dimethyl dichlorosilane, dimethyl dimethoxysilane, tridecafluoro-1,1,2,2-tetrahydrooctyl-1-methyl-1-diethoxysilane, tridecafluoro-1,1,2,2-tetrahydrooctyl-1,1-methyl-1-ethoxysilane, tridecafluoro-1,1,2,2-tetrahydrooctyl-1,1-methyl-1-chlorosilane, methyl trichlorosilone, ethyl trichlorosilane, butyl trichlorosilane, hexyl trichlorosilane, octyl trichlorosilane, hexamethyldisilazane (of the structure $(CH_3)_3Si(NH)Si(CH_3)_3$, trimethyl chlorosilane, triethyl chlorosilane, trimethyl methoxysilane, tributyl chlorosilane, and the like. When the coated article is a metal oxide particle, such as a silica particle, the silanating agent can also employ longer chain lengths on the R group, such as dodecyl trichlorosilane, $CF_3(CF_2)_6(CH_2)_2SiCl_3$, or the like.

While not being limited to any particular theory, it is believed that the alkoxy groups or halogen atoms hydrolyze in the presence of water to form hydroxyl groups. These hydroxyl groups then condense together to form a crosslinked polymeric structure of R—Si groups held together by Si—O—Si bonds. Accordingly, when the surface being coated does not contain reactive groups, no surface reaction of the fluorosilane with the coated article is believed to occur. In this instance, it is necessary that at least one of X' and X" be reactive, such as a halogen atom or an alkoxy group, since surface bonds will not occur. When the surface being coated contains reactive groups, however, such as when the coated surface is a silica particle, a glass or quartz surface, or the like, the reactive surface groups (silanols in the case of a silicon oxide material) react with the silane to form a covalent bond not easily broken; this covalent bond renders the surface treatment more stable and prevents the surface treatment from being removed from the coated particles to build up in the channels of the apparatus.

The hydrophobic coating can be applied to the apparatus and to the marking material of the present invention by any desired or suitable process. For example, the hydrophobic coating can be applied via a solution coating process, wherein the hydrophobic material or its precursor is added to a solvent and the solution thus formed is applied to the surface(s) to be coated. The marking material particles and/or the additive particles can be solution coated with the hydrophobic material by dispersing the marking material particles or additive particles in a suitable solvent, thereafter adding the hydrophobic material or its precursor to the solution, and agitating the solution, optionally followed by filtering and washing the coated particles. In one embodiment, 100 parts by weight of marking material particles or additive particles are admixed typically with from about 200 to about 2,000 parts by weight solvent, and typically with from about 1 to about 100 parts by weight, preferably from about 5 to about 40 parts by weight, of the selected hydrophobic coating material or its precursor, followed by mixing, typically at from about 50 to about 500 revolutions per minute at a temperature typically of from about 10 to about 100° C., and preferably from about 15 to about 50° C., for a period typically of from about 0.25 to about 5 hours, and preferably from about 0.5 to about 2 hours, although the relative amounts, mixing speed, mixing time, and mixing temperature can be outside of these ranges. The resulting slurry is then filtered by any suitable method, such as vacuum filtration or the like. The particle filter cake thus obtained is then washed, typically from about 1 to about 10 times, with typically from about 50 to about 1,000 parts by weight of a solvent, such as methylene chloride, and subsequently dried by any desired method, such as a vacuum oven, a convection oven, a fluidized bed dryer, or the like. Suitable solvents include those sufficient to disperse the particles in typical relative amounts of, for example, from about 2 about 20 parts by weight solvent, and preferably from about 5 to about 10 parts by weight solvent, per one part by weight of the particles. Examples of suitable solvents include toluene, benzene, alcohols, such as methanol, ethanol, n-propanol, isopropanol, butanol, and the like, methyl ethyl ketone, ethyl acetate, methylene chloride, pentane, hexane, heptane, cyclohexane, and the like.

In addition, the hydrophobic coating can be applied to the apparatus and to the marking material of the present invention by a gas phase coating process. The marking material particles and/or the additive particles can be gas phase coated with the hydrophobic material by adding the particles to a suitable reactor, such as a stainless steel stirred tank reactor, a tubular reactor, a packed column reactor, a tower reactor, or the like, and adding to the reactor a vapor of the hydrophobic material or its precursor under vacuum with optional application of heat; alternatively, instead of adding the hydrophobic material or its precursor under vacuum, the hydrophobic material or its precursor can be added with a carrier gas, such as dry air, nitrogen, or the like, and the gas and/or precursor and/or substrate can be optionally heated. In either of these embodiments, the reactor contents or the substrate can be optionally heated, optionally in vacuum, to complete the curing of the silane polymer coating and/or to remove any volatile side products of the treatment process. In one embodiment of the gas phase process, about 100 parts by weight of particles are loaded into a reactor vessel. The hydrophobic material or its precursor, typically from about 1 to about 100 parts by weight, is loaded into a separate vessel. If a carrier gas is to be used, the outlet of the hydrophobic material vessel is connected to the inlet of the reactor. The inlet of the hydrophobic material vessel is connected to an air source and air is passed through the hydrophobic material or its precursor until all of the material is volatilized and carried through the reactor containing the particles. The relative humidity of the air stream preferably is controlled in the range of from 0 to about 50 percent relative humidity, and preferably from about 1 to about 25 percent relative humidity. This step typically takes from about 0.25 to about 5 hours. If a vacuum process is to be used, the outlet of the hydrophobic material vessel is connected to the inlet of the reactor. Both vessels are connected to a vacuum source, creating a vacuum of from about $10^{-3}$ to about $10^{+1}$ Torr in the two vessels, thereby causing the hydrophobic material or its precursor to be volatilized and carried into the reactor containing the particles to be coated. This step typically takes from about 0.25 to about 10 hours. For both gas phase processes, it is preferable, although not essential, to have mixing in the reactor during the coating process, with, for example, a mechanical agitator, grinding media, turbulent flow of the carrier gas in column or tower type reactors, or the like. Temperatures typically are from about 10 to about 100° C., and preferably from about 15 to about 50° C. The relative amounts, times, temperatures, relative humidities, and pressures can, however, be outside of the indicated ranges.

The apparatus of the present invention can be coated by solution coating or gas phase coating processes similar to those employed to coat the marking materials. If the channel walls are of glass or quartz, surface groups such as silanols can react with the silane. In the absence of surface reactive groups, the silane polymer will form on the surface without reacting with the surface. When the channel walls are of silicon, if desired, the silicon surface can be subjected to a pretreatment to oxidize the surface more fully (silicon surfaces tend to have an oxide coating in any event once they are exposed to the atmosphere) before applying the silanating agent.

The processes for coating metal oxides with amine coupling agents described in, for example, U.S. Pat. No. 5,376,172, the disclosure of which is totally incorporated herein by reference, can also be employed in the present invention.

The hydrophobic coating is present on the inner channel surfaces of the apparatus of the present invention in any desired or suitable dry thickness, typically from about 0.2 nanometer to about 5 microns, and preferably from about 0.5 nanometer to about 2 microns, although the thickness can be outside of these ranges.

The hydrophobic coating is present on the marking material particles and/or the additive particles of the present invention in any desired or suitable coating weight, typically from about 0.2 to about 70 percent by weight of the coated particles, and preferably from about 1 to about 40 percent by weight of the coated particles, although the coating weight can be outside of these ranges.

Further information and details regarding solution coating and gas phase coating of silane materials onto substrates such as marking particles or additive particles is disclosed in, for example, U.S. Pat. Nos. 5,484,675 and 5,376,172, the disclosures of each of which are totally incorporated herein by reference.

The marking material particles typically are from about 0.5 to about to 10 microns in average particle diameter, and preferably from about 1 to about 5 microns in average particle diameter, although particle sizes outside of these ranges can also be used, particularly in specific applications (such as larger or smaller ports and channels through which the particles must travel, or the like).

Electrophotographic toner particles are generally suitable as the marking materials particles for the present invention. The toner particles are preferably used with a surface flow additive, although said additive is not required. Particularly preferred flow additives include silica particles, including those coated with a hydrophobic low surface energy silane or fluorosilane, or silane polymers or fluorosilane polymers.

Specific embodiments of the invention will now be described in detail. These examples are intended to be illustrative, and the invention is not limited to the materials, conditions, or process parameters set forth in these embodiments. All parts and percentages are by weight unless otherwise indicated.

EXAMPLE I

In a glass vessel 500 milligrams of Degussa® A380 silica was dispersed in cyclohexane to which 175 milligrams of tridecafluoro-1,1,2,2-tetrahydrooctyltrichlorosilane had been added, followed by 30 minutes of stirring and subsequent drying in vacuum. While the initial untreated A380 silica had 1.5 milligrams of water per gram at 80 percent relative humidity as determined by infrared spectroscopy, the treated silica had only 0.6 milligram of water per gram, indicating that the hydrophobic treatment was effective to increase the hydrophobicity of the silica. The cohesion of a Xerox® 1075 toner with 0.5 weight percent of the treated silica as a surface additive was determined using the standard Hosokawa Micron Powder Characteristics tester. Specifically, the cohesion was tested by applying a 1 millimeter vibration for 90 seconds to 2 grams of the toner particles on a set of stacked screens. The top screen contained 150 micron openings, the middle screen contained 75 micron openings, and the bottom screen contained 45 micron openings. The percent cohesion is calculated as follows:

% cohesion=50·$A$+30·$B$+10·$C$ wherein A is the mass of toner remaining on the 150 micron screen, B is the mass of toner remaining on the 75 micron screen, and C is the mass of toner remaining on the 45 micron screen. (The equation applies a weighting factor proportional to screen size.) This test method is further described in, for example, R. Veregin and R. Bartha, Proceedings of IS&T 14th International Congress on Advances in Non-impact Printing Technologies, pg. 358–361, 1998, Toronto, the disclosure of which is totally incorporated herein by reference. The toner was determined to have a cohesion of 2.6 percent measured at 85 percent relative humidity. The same toner with 0.5 weight percent of the untreated silica had a cohesion of 6.8 percent measured at 85 percent relative humidity. These results demonstrate the effectiveness of the low surface energy coating for reducing the adhesion that occurs between toner particles, resulting in the lower cohesion.

EXAMPLE II

In a glass vessel 500 milligrams of Degussa® A380 silica were dried by evacuating for 15 minutes, followed by exposure to triethylamine vapor for 5 minutes, followed by further evacuating for 5 minutes to remove excess triethylamine vapor. The treated silica thus prepared was then dispersed in cyclohexane to which 140 milligram of octadecyltrichlorosilane had been added, followed by 30 minutes of stirring, washing two times with methanol, and drying in vacuum. The resulting treated silica had only 1.0 milligram of water per gram at 80 percent relative humidity as determined by infrared spectroscopy, indicating that the hydrophobic treatment was effective to increase the hydrophobicity of the silica.

EXAMPLE III

In a glass vessel 500 milligrams of Degussa® A380 silica were exposed to 3,3,3-trifluorpropyltrichlorosilane vapor for 1 minute, followed by evacuation for 5 minutes. The resulting treated silica had only 0.8 milligrams of water per gram at 80 percent relative humidity as determined by infrared spectroscopy, indicating that the hydrophobic treatment was effective to increase the hydrophobicity of the silica.

EXAMPLE IV

A 5 centimeter by 8 centimeter glass slide was treated for 5 minutes by dipping it in a solution of 50 milligrams of tridecafluoro-1,1,2,2-tetrohydrooctyltrichlorosilane in 100 milliliters of cyclohexane. The sample was then dried in a vacuum oven at 100° C. for 16 hours. The contact angle of an advancing water drop was 100 degrees, compared to a value of 40 degrees on an untreated glass slide.

EXAMPLE V

A 5 centimeter by 8 centimeter glass slide was treated for 5 hours by exposure to hexamethyidisilazane vapor at room temperature. The sample was then dried in vacuum at 100° C. for 16 hours. The contact angle of an advancing water drop was 90 degrees, compared to a value of 40 degrees on an untreated glass slide.

EXAMPLE VI

A 3 centimeter square aluminum plate was treated for 5 minutes by dipping it in a solution of 50 milligrams of tridecafluoro-1,1,2,2-tetrahydrooctyltrichlorosilane in 100 milliliters of cyclohexane. The sample was then dried in a vacuum oven at 100° C. for 16 hours. The contact angle of an advancing water drop was 105 degrees, compared to a value of 50 degrees on an untreated aluminum plate.

EXAMPLE VII

A glass capillary tube with a 47 micron internal diameter was treated by bubbling compressed air through trifluoropropyltrichlorosilane in a glass vessel, the outlet of which was connected to the inlet of the glass reaction vessel containing the capillary for 10 hours. The capillary was then dried in vacuum at 100° C. for 18 hours. It is believed that the interior of the treated glass capillary will have an increase in surface hydrophobicity and a decrease in surface free energy. It is also believed that this hydrophobicity increase and surface energy decrease will enable marking material particles to pass more easily through these capillaries than through untreated capillaries, especially when the toner contains surface flow additives that have been subjected to surface treatment with trifluoropropyltrichlorosilane.

EXAMPLE VIII

A glass capillary tube with a 47 micron internal diameter was treated by bubbling dry nitrogen gas through trifluoropropyltrichlorosilane in a glass vessel, the outlet of which was connected to the inlet of the glass reaction vessel containing the capillary for 4 days. The capillary was then dried in vacuum at 100° C. for 18 hours. It is believed that the interior of the treated glass capillary will have an increase in surface hydrophobicity and a decrease in surface free energy. It is also believed that this hydrophobicity increase and surface energy decrease will enable marking material particles to pass more easily through these capillaries than through untreated capillaries, especially when the toner contains surface flow additives that have been subjected to surface treatment with trifluoropropyltrichlorosilane.

Other embodiments and modifications of the present invention may occur to those of ordinary skill in the art subsequent to a review of the information presented herein; these embodiments and modifications, as well as equivalents thereof, are also included within the scope of this invention.

What is claimed is:

1. An apparatus for depositing a particulate marking material onto a substrate, comprising (a) a printhead having defined therein at least one said channel, each channel having an inner surface and an exit orifice with a width no larger than about 250 microns, the inner surface of each channel having thereon a hydrophobic coating material; (b) a propellant source connected to each said, channel such that propellant provided by the propellant source can flow through each said channel to form propellant streams therein, said propellant streams having kinetic energy, each said channel directing the propellant stream through the exit orifice toward the substrate; and (c) a marking material reservoir having an inner surface, said inner surface having thereon the hydrophobic coating material, said reservoir containing particles of a particulate marking material, said reservoir being communicatively connected to each said channel such that the particulate marking material from the reservoir can be controllably introduced into the propellant stream in each said channel so that the kinetic energy of the propellant stream can cause the particulate marking material to impact the substrate, wherein either (i) the marking material particles of particulate marking material have an outer coating of the hydrophobic coating material; or (ii) the marking material particles have additive particles on the surface thereof, said additive particles having an outer coating of the hydrophobic coating material; or (iii) both the marking material particles and the additive particles have an outer coating of the hydrophobic coating material.

2. An apparatus according to claim 1 wherein the marking material particles of particulate marking material have an outer coating of the hydrophobic coating material.

3. An apparatus according to claim 1 wherein the marking material particles have additive particles on the surface thereof, said additive particles having an outer coating of the hydrophobic coating material.

4. An apparatus according to claim 1 wherein both the marking material particles and the additive particles have an outer coating of the hydrophobic coating material.

5. An apparatus according to claim 1 wherein the hydrophobic coating material provides an advancing contact angle with water that is greater than about 80 degrees.

6. An apparatus according to claim 1 wherein the hydrophobic coating material has a surface energy of less than about 50 milliJoules per square meter.

7. An apparatus according to claim 1 wherein the hydrophobic coating material is an alkane, a fluoroalkane, a silane, a fluorosilane, a polysilane, a polyfluorosilane, or a mixture thereof.

8. An apparatus according to claim 1 wherein the hydrophobic coating material is formed by reacting the inner surface with a material selected from (a) alcohols, (b) diacyl peroxides, (c) alkyl halides, (d) acid halides, (e) alkyl thiols, (f) silanating agents of the formula

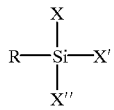

wherein R is a non-reactive group, X is a halogen atom or an alkoxy group, and X' and X" are each, independently of the other, halogen atoms, alkoxy groups, alkyl groups, or fluoroalkyl groups, or (g) mixtures thereof.

9. An apparatus according to claim 8 wherein the hydrophobic coating material is formed by reacting the inner surface with a silanating agents of the formula

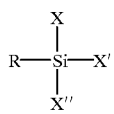

wherein R is an alkyl group, a fluoroalkyl group, or a heteroalkyl group.

10. An apparatus according to claim 8 wherein the hydrophobic coating material is formed by reacting the inner surface with a silanating agents of the formula

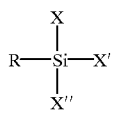

wherein only X is alkoxy or halide.

11. An apparatus according to claim 8 wherein the hydrophobic coating material is formed by reacting the inner surface with a silanating agents of the formula

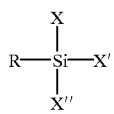

wherein only X and X' are alkoxy or halide.

12. An apparatus according to claim 8 wherein the hydrophobic coating material is formed by reacting the inner surface with a silanoting agents of the formula

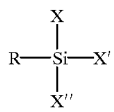

wherein all three of X, X', and X" are alkoxy or halide.

13. An apparatus according to claim 1 wherein the hydrophobic coating material is formed by reacting the inner surface with a material which is butanol, propanol, decanol, octadecyl alcohol, trifluoroethanol, heptafluorobutanol, hexafluoropropanol, tridecafluorooctanol, $(F_7C_3-CO_2)_2$, $(H(CF_2)_4-CO_2)_2$, $(H_7C_3OCF(CF_3)-CO_2)_2$, perfluoroethyl iodide, perfluorobutyl iodide, perfluorohexyl iodide, perfluorodecyl iodide, heptafluorobutyryl chloride, butanoyl chloride, butanethiol, heptanethiol, decanethiol, trifluoropropyl trichlorosilane, trifluoropropyl triethoxysilane, tridecafluoro-1,1,2,2,-tetrahydrooctyl-1-trichlorosilane, tridecafluoro-1,1,2,2,-tetrahydrooctyl-1-triethoxysilane, tridecafluoro-1,1,2,2-tetrahydrooctyl-1-methyl-1-dichlorosilane, heptadecafluoro-1,1,2,2-tetrahydrodecyl-1-trimethoxysilane, dimethyl dichlorosilane, dimethyl dimethoxysilane, tridecafluoro-1,1,2,2-tetrahydrooctyl-1-methyl-1-diethoxysilane, tridecafluoro-1,1,2,2-tetrahydrooctyl-1,1-methyl-1-ethoxysilane, tridecafluoro-1,1,2,2-tetrahydrooctyl-1,1-methyl-1-chlorosilane, methyl trichlorosilane, ethyl trichlorosilane, butyl trichlorosilane, hexyl trichlorosilane, octyl trichlorosilane, hexamethyidisilazane, trimethyl chlorosilane, triethyl chlorosilane, trimethyl methoxysilane, tributyl chlorosilane, or mixtures thereof.

14. An apparatus according to claim 1 wherein the inner surface of the channel and the inner surface of the marking material reservoir each, independently of the other, comprise a material selected from silicon, glass, quartz, ceramics, polymers, metals, metal oxides, or mixtures thereof.

15. An apparatus according to claim 1 wherein the inner surface of the channel and the inner surface of the marking material reservoir each, independently of the other, comprise a material selected from epoxies, photoresistive polymers, polymers containing vinyl or diene substituents, polymers containing reactive side chain or terminal end groups, iron, titanium, nickel, copper, zirconium, aluminum, platinum, gold, or mixtures thereof.

16. A process for depositing marking material onto a substrate which comprises (a) providing a propellant to a printhead, said printhead having defined therein at least one channel, each said channel having an inner surface and an exit orifice with a width no larger than about 250 microns through which the propellant can flow, said propellant flowing through each said channel, thereby forming a propellant stream having kinetic energy, each said channel directing the propellant stream toward the substrate, the inner surface of each said channel having thereon a hydrophobic coating material; and (b) controllably introducing a particulate marking material into the propellant stream in each said channel, wherein the kinetic energy of the propellant stream causes the particulate marking material to impact the substrate, and wherein either (i) the marking material particles of particulate marking material have an outer coating of the hydrophobic coating material; or (ii) the marking material particles have additive particles on the surface thereof, said additive particles having an outer coating of the hydrophobic coating material; or (iii) both the marking material particles and the additive particles have an outer coating of the hydrophobic coating material.

17. A process according to claim 16 wherein the particulate marking material is contained in a marking material reservoir having an inner surface, said inner surface having thereon the hydrophobic coating material, said reservoir being communicatively connected to each said channel such that the particulate marking material from the reservoir can be controllably introduced into the propellant stream in each said channel so that the kinetic energy of the propellant stream can cause the particulate marking material to impact the substrate.

18. A process according to claim 16 wherein the hydrophobic coating material provides an advancing contact angle with water that is greater than about 80 degrees.

19. A process according to claim 16 wherein the hydrophobic coating material has a surface energy of less than about 50 milliJoules per square meter.

20. A process according to claim 16 wherein the hydrophobic coating material is an alkane, a fluoroalkane, a silane, a fluorosilane, a polysilane, a polyfluorosilane, or a mixture thereof.

* * * * *